United States Patent
Ito et al.

(10) Patent No.: US 9,220,079 B2
(45) Date of Patent: Dec. 22, 2015

(54) SIGNAL ANALYSIS DEVICE, SYNCHRONIZATION SYSTEM, AND SYNCHRONIZATION METHOD

(71) Applicant: ANRITSU CORPORATION, Kanagawa (JP)

(72) Inventors: Shinichi Ito, Kanagawa (JP); Go Inoue, Kanagawa (JP); Jun Ono, Kanagawa (JP); Keisuke Nishio, Kanagawa (JP); Yuki Kondo, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 14/323,407

(22) Filed: Jul. 3, 2014

(65) Prior Publication Data

US 2015/0092826 A1    Apr. 2, 2015

(30) Foreign Application Priority Data

Sep. 30, 2013  (JP) ................................. 2013-204149

(51) Int. Cl.
*H04W 56/00*    (2009.01)
*H04W 24/06*    (2009.01)
*H04J 3/06*    (2006.01)

(52) U.S. Cl.
CPC .............. *H04W 56/002* (2013.01); *H04J 3/06* (2013.01); *H04W 24/06* (2013.01); *H04W 56/0035* (2013.01)

(58) Field of Classification Search
CPC ....... H04J 3/06; H04W 56/002; H04W 24/06; H04W 56/0035; H04W 56/00
See application file for complete search history.

(56) References Cited

U.S. PATENT DOCUMENTS

| | | | | |
|---|---|---|---|---|
| 4,677,647 | A  * | 6/1987 | Aoyagi | 375/344 |
| 5,671,214 | A  * | 9/1997 | Tanaka | 370/218 |
| 6,977,965 | B2 * | 12/2005 | Nguyen et al. | 375/279 |
| 2002/0058486 | A1* | 5/2002 | Persson | 455/150.1 |
| 2006/0068739 | A1* | 3/2006 | Maeda et al. | 455/295 |
| 2008/0123769 | A1* | 5/2008 | Nakao | 375/267 |
| 2010/0283911 | A1* | 11/2010 | Belotserkovsky | 348/726 |
| 2013/0069738 | A1* | 3/2013 | Tsuie | 333/100 |
| 2014/0203756 | A1* | 7/2014 | Kajiura et al. | 318/812 |

FOREIGN PATENT DOCUMENTS

| | | |
|---|---|---|
| JP | 2009250717 | 10/2009 |
| JP | 2009250719 | 10/2009 |

* cited by examiner

*Primary Examiner* — Jean B Corrielus
(74) *Attorney, Agent, or Firm* — Pearne & Gordon LLP

(57) ABSTRACT

A signal analysis device includes a synchronization data generation unit, a synchronization correction value calculation unit, and a correction unit. The synchronization unit outputs an A/D-converted correction signal as first synchronization data. The first synchronization data is associated with time based on the timing of a trigger signal input from the outside. The synchronization correction value calculation unit calculates, as a first synchronization correction value, an amplitude ratio, a phase difference, and a time difference between the first synchronization data and second synchronization data input from the outside on the basis of the first synchronization data and the second synchronization data. The correction unit corrects the amplitude, phase, and timing of the RF signal output from the object to be measured, on the basis of the first synchronization correction value or a second synchronization correction value input from the outside.

9 Claims, 5 Drawing Sheets

(a)

(b)

SIGNAL ANALYSIS DEVICE, SYNCHRONIZATION SYSTEM, AND SYNCHRONIZATION METHOD

TECHNICAL FIELD

The present invention relates to a signal analysis device, a synchronization system, and a synchronization method.

BACKGROUND ART

In recent years, with the spread of large-volume content service, there has been a demand for a significant improvement in transmission speed (throughput). For example, in LTE-Advanced (LTE-A) standardized by Third Generation Partnership Project (3GPP), for example, a multi-input multi-output (MIMO) system is used as a technique corresponding to the demand.

In the MIMO system, high-speed data communication is performed by M×N paths formed between a plurality of (M) transmitter-side antennas and a plurality of (N) receiver-side antennas.

As such, in a communication system which transmits and receives a plurality of different signals at the same time, a signal analysis device is used to evaluate the quality of a transmitter-side signal.

As the signal analysis device, a device has been known which three-dimensionally displays, as a parameter, the size of each frequency component obtained by analysis on a coordinate system in which the frequency (received frequency) to be analyzed is one coordinate axis and the analysis time (received time) is the other coordinate axis (for example, see Patent Documents 1 and 2).

RELATED ART DOCUMENT

Patent Document

[Patent Document 1] Japanese Patent Application Publication No. 2009-250719

[Patent Document 2] Japanese Patent Application Publication No. 2009-250717

DISCLOSURE OF THE INVENTION

Problem that the Invention is to Solve

When a plurality of signal analysis devices are synchronized by a trigger signal and are used to perform measurement, star connection and daisy chain connection are given as examples of the cable connection method of the plurality of signal analysis devices.

In the daisy chain connection, a plurality of signal analysis devices are connected in a daisy chain manner. The daisy chain connection has an advantage that, even when there are a large number of signal analysis devices, it is easy to wire the signal analysis devices with cables. However, it is difficult to equalize the lengths of the cables, which makes it difficult to trigger the signal analysis devices at the same time.

In contrast, in the star connection, a plurality of signal analysis devices are connected to a branch circuit (hub) by cables. In this case, the lengths of the cables are exactly equal to each other, which makes it possible to trigger the signal analysis devices at the same time.

However, in the signal analysis devices according to the related art disclosed in Patent Documents 1 and 2, a difference in phase, amplitude, and timing between the plurality of signal analysis devices occurs due to the following.

A difference between the lengths of a plurality of RF cables for connecting a plurality of objects to be measured and the plurality of signal analysis devices A difference between the lengths of a plurality of trigger cables for connecting the plurality of signal analysis devices A difference between paths from signal input terminals to A/D conversion units in the plurality of signal analysis devices A difference between the rising times of an ADC clock in the A/D conversion units of the plurality of signal analysis devices A phase difference between the local signals of the plurality of signal analysis devices In the related art, when the processing timing difference between two signal analysis devices is calculated, evaluation is performed by the following mutual correlation function.

When a data string of the A/D-converted signals to be measured in a first signal analysis device is $s_1(n)$ and a data string of the A/D-converted signals to be measured in a second signal analysis device is $s_2(n)$, a mutual correlation function $\phi_{1,2}(m)$ is represented by Equation 1. In Equation 1, N indicates the average range of the data string.

$$\varphi_{1,2}(m) = \frac{1}{N}\sum_{n=0}^{N-1} s_1(n)s_2(n+m) \quad \text{[Equation 1]}$$

When the position of the peak in Equation 1 is found, it is possible to estimate the timing difference between the data strings $s_1(n)$ and $s_2(n)$ with the accuracy of the ADC clock. However, since the ADC clock generally has a cycle of about 100 MHz, it is only possible to estimate a timing difference of up to 10 ns.

As described above, in the related art, a technique for synchronizing the phase and timing of a plurality of signal analysis devices is not considered. Therefore, it is difficult to synchronize a plurality of signal analysis devices with high accuracy.

The invention has been made in order to solve the above-mentioned problems of the related art and an object of the invention is to provide a signal analysis device, a synchronization system, and a synchronization method which can synchronize the phase and timing of a plurality of signal analysis devices and synchronize the plurality of signal analysis devices with high accuracy.

Means for Solving the Problem

In order to solve the above-mentioned problems, according to a first aspect of the invention, there is provided a signal analysis device that analyzes an RF signal output from an object to be measured. The signal analysis device includes: a local signal generation unit that generates a local signal; a mixer unit that receives the local signal and either the RF signal or a correction signal which is input from the outside, converts the RF signal or the correction signal into an intermediate frequency signal in a predetermined intermediate frequency band, and outputs the intermediate frequency signal; an A/D conversion unit that samples the intermediate frequency signal to convert the intermediate frequency signal into a digital signal string; a synchronization data generation unit that outputs the intermediate frequency signal as first synchronization data which is associated with time based on the timing of a trigger signal input from the outside, when the correction signal is input to the mixer unit; a synchronization correction value calculation unit that calculates an amplitude ratio, a phase difference, and a time difference between the first synchronization data which is output from the synchronization data generation unit and second synchronization data which is input from the outside as a first synchronization correction value, on the basis of the first synchronization data and the second synchronization data; and a correction unit that corrects the amplitude, phase, and timing of the RF signal on the basis of the first synchronization correction value calculated by the synchronization correction value calculation unit when the RF signal is input to the mixer unit. In this case, when the RF signal is input to the mixer unit, the correction unit may correct the amplitude, phase, and timing of the RF signal on the basis of the first synchronization correction value which is calculated by the synchronization correction value calculation unit or a second synchronization correction value which is input from the outside.

According to this structure, when a plurality of signal analysis devices are used to simultaneously perform signal processing in parallel, it is possible to achieve a signal analysis device which can synchronize a plurality of signal analysis devices with high accuracy.

According to a second aspect of the invention, there is provided a synchronization system that synchronizes a plurality of the signal analysis devices. The synchronization system includes a signal generator that simultaneously inputs the same correction signal to the mixer units of two of the plurality of signal analysis devices and simultaneously inputs the same trigger signal to the synchronization data generation units of the two signal analysis devices.

According to this structure, when a plurality of signal analysis devices are used to simultaneously perform signal processing in parallel, it is possible to achieve a synchronization system which can synchronize a plurality of signal analysis devices with high accuracy.

According to a third aspect of the invention, in the synchronization system according to the above-mentioned aspect, the first synchronization data which is output from the synchronization data generation unit of one of the two signal analysis devices may be input to the synchronization correction value calculation unit of the other signal analysis device.

According to a fourth aspect of the invention, in the synchronization system according to the above-mentioned aspect, the first synchronization correction value which is output from the synchronization correction value calculation unit of one of the two signal analysis devices may be input to the correction unit of the other signal analysis device.

According to a fifth aspect of the invention, there is provided a synchronization method that synchronizes a plurality of the signal analysis devices. The synchronization method includes: a correction signal input step of simultaneously inputting the same correction signal to the mixer units of two of the plurality of signal analysis devices and simultaneously inputting the same trigger signal to the synchronization data generation units of the two signal analysis devices; a synchronization data generation step of allowing the synchronization data generation unit of one of the two signal analysis devices to generate the first synchronization data in which the time based on the timing of the trigger signal is associated with the intermediate frequency signal of the correction signal output from the mixer unit; a synchronization correction value calculation step of calculating, as the first synchronization correction value, the amplitude ratio, the phase difference, and the time difference between the first synchronization data which is generated in the synchronization data generation step and the second synchronization data generated by the synchronization data generation unit of the other signal analysis device, on the basis of the first synchronization data and the second synchronization data; an RF signal input step of inputting the RF signal which is output from the object to be measured to the mixer unit of one of the two signal analysis devices and simultaneously inputting the same trigger signal to the synchronization data generation units of the two signal analysis devices; an RF data generation step of allowing the synchronization data generation unit of the signal analysis device, to which the RF signal is input, to generate RF data in which the time based on the timing of the trigger signal is associated with an intermediate frequency signal of the RF signal output from the mixer unit; and a correction step of correcting the amplitude, phase, and timing of the RF signal on the basis of the first synchronization correction value calculated in the synchronization correction value calculation step.

Advantage of the Invention

The invention provides a signal analysis device, a synchronization system, and a synchronization method which can synchronize the phase and timing of a plurality of signal analysis devices and synchronize the plurality of signal analysis devices with high accuracy.

BEST MODE FOR CARRYING OUT THE INVENTION

Hereinafter, embodiments of a signal analysis device, a synchronization system, and a synchronization method according to the invention will be described with reference to the drawings.

Figure 1:
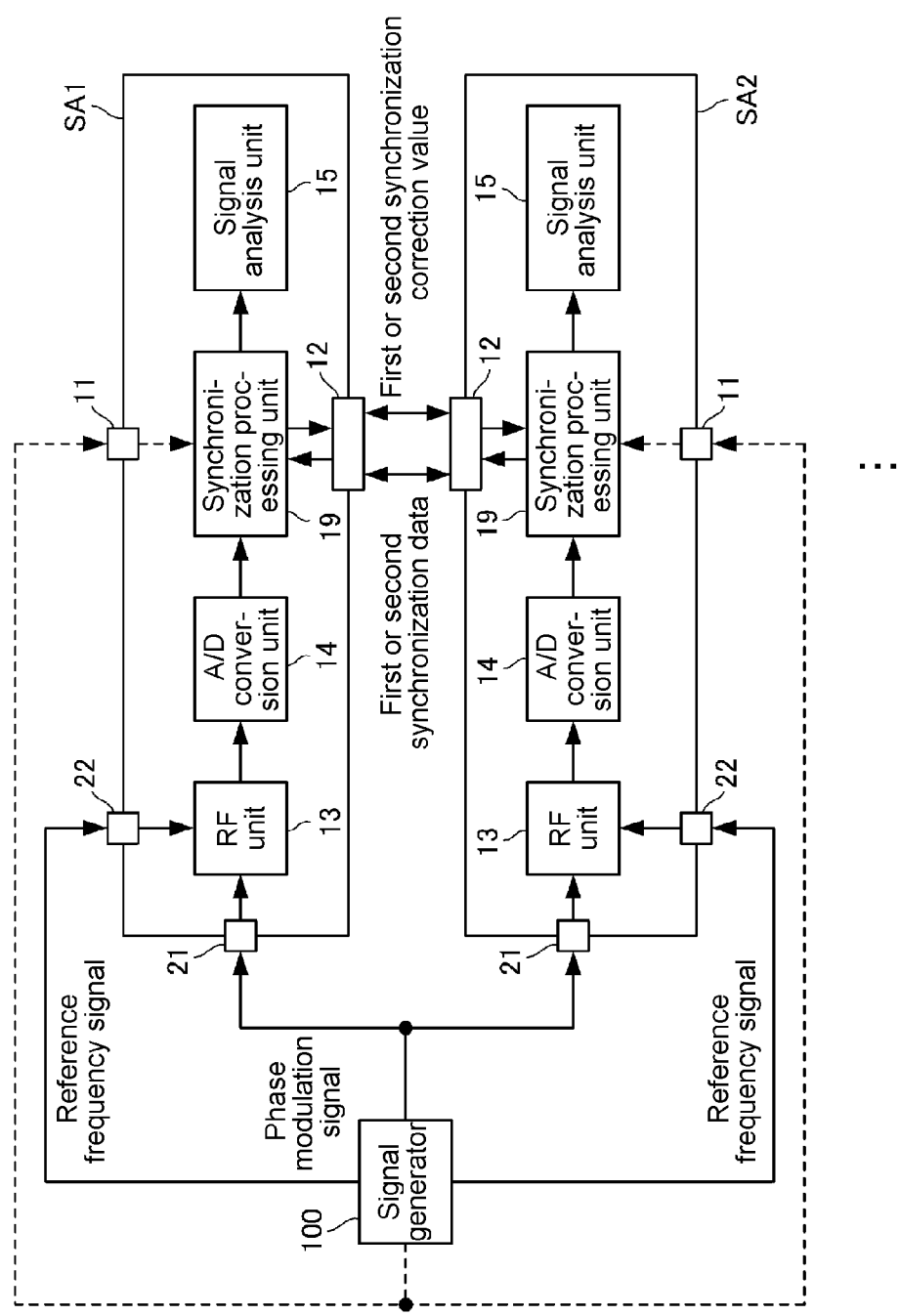
FIG. 1 is a block diagram illustrating the structure of a synchronization system according to an embodiment of the invention.

As shown in FIG. 1, a synchronization system 1 according to an embodiment of the invention includes a plurality of signal analysis devices SA1, SA2, . . . which analyze an RF signal output from an object to be measured and a signal generator 100 which outputs the same phase modulation signal and the same trigger signal to two of the plurality of signal analysis devices SA1, SA2, . . . at the same time. Since the phase modulation signal has a correction function, in some cases, it is referred to as a correction signal.

The plurality of signal analysis devices SA1, SA2, . . . can be connected to the signal generator 100 or each of a plurality of objects to be measured by a plurality of RF cables. In addition, the plurality of signal analysis devices SA1, SA2, . . . can be connected to each other in a star shape or a daisy chain shape by trigger cables.

At that time, the plurality of RF cables need to have the same length. It is preferable that the trigger cables have the same length. However, when the trigger cables have different lengths, the propagation delay time due to the difference in the length needs to be evaluated in advance.

Figure 2:
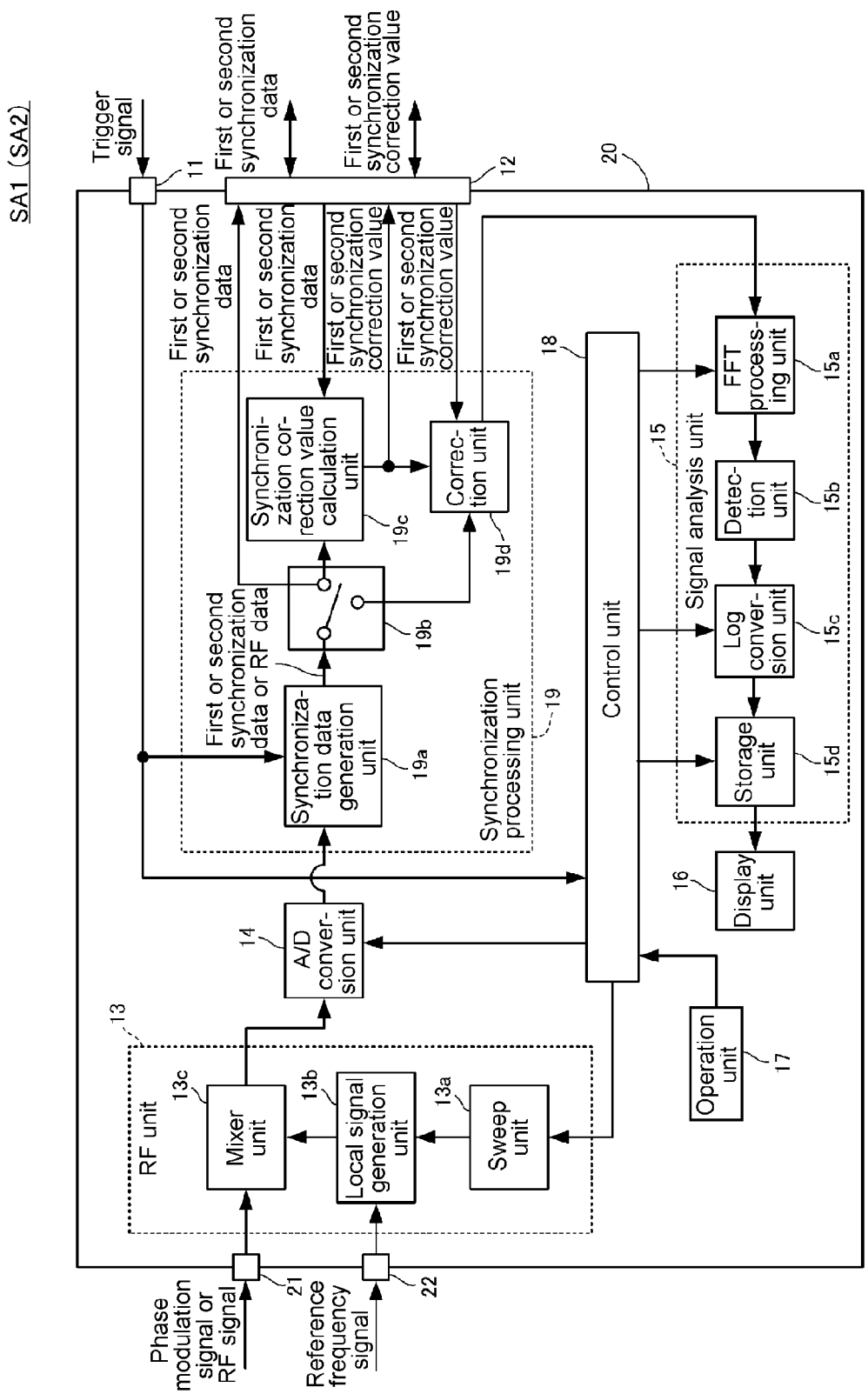
FIG. 2 is a block diagram illustrating an example of the detailed structure of a signal analysis device provided in the synchronization system according to the embodiment of the invention.

FIG. 2 shows an example of the detailed structure of the signal analysis device SA1. The other signal analysis devices SA2, SA3, . . . have the same structure as the signal analysis device SA1. The signal analysis device SA1 has an RF unit 13, an A/D conversion unit 14 (analog-to-digital converter), a signal analysis unit 15, a display unit 16, an operation unit 17, a control unit 18, and a synchronization processing unit 19 which are provided in a housing 20.

The housing 20 includes a trigger input terminal 11, a data input/output terminal 12, a signal input terminal 21, and a reference frequency input terminal 22.

The RF unit 13 includes a sweep unit 13a, a local signal generation unit 13b, and a mixer unit 13c.

The local signal generation unit 13b is, for example, a PLL circuit (not shown), receives an instruction for the center frequency fc of a measurement frequency from the control unit 18 through the sweep unit 13a, oscillates a local signal at a local frequency (fc+$f_{IF}$), and transmits the local signal to the mixer unit 13c.

In this embodiment, it is important that all of the signal analysis devices SA1, SA2, . . . use the same frequency standard.

Therefore, the local signal generation unit 13b is configured such that it can receive a reference frequency signal which is output from the signal generator 100 or an external signal generator through the reference frequency input terminal 22 and use the received reference frequency signal instead of the reference frequency signal which is oscillated by an oscillator (not shown) of the PLL circuit in the local signal generation unit 13b.

Alternatively, the local signal generation unit 13b may be configured such that it can receive a local signal with an oscillating frequency (fc+$f_{IF}$) which is output from the local signal generation units 13b of other signal analysis devices SA2, SA3, . . . or the external signal generator through the reference frequency input terminal 22 and transmit the received local signal to the mixer unit 13c, instead of the local signal with the local frequency (fc+$f_{IF}$) which is oscillated by the local signal generation unit 13b.

The mixer unit 13c mixes the RF signal input from the signal input terminal 21 or the phase modulation signal output from the signal generator 100 and the local signal with the local frequency (fc+$f_{IF}$), converts the signals into a signal with an intermediate frequency ($f_{IF}$±$\Delta F_{Max}$/2), and transmits the intermediate frequency signal to the A/D conversion unit 14.

The A/D conversion unit 14 (analog-to-digital converter) samples the intermediate frequency signal (frequency: $f_{IF}$±$\Delta F_{Max}$/2) output from the RF unit 13 with a predetermined clock from the control unit 18 to convert the intermediate frequency signal into digital data.

The synchronization processing unit 19 includes a synchronization data generation unit 19a, a switching unit 19b, a synchronization correction value calculation unit 19c, and a correction unit 19d. The synchronization processing unit 19 is, for example, a logic circuit, such as a field programmable gate array (FPGA) or an application specific integrated circuit (ASIC).

The synchronization data generation unit 19a stores the digital data (amplitude value) output from the A/D conversion unit 14 in a memory area, using the elapsed time of a clock based on the measurement frequency and the timing of the pulse of a trigger signal as an address. The stored digital data is, so to speak, data in the time domain.

Hereinafter, when the data in the time domain results from the RF signal output from the object to be measured, it is referred to as "RF data". When the data in the time domain results from the phase modulation signal, it is referred to as "first synchronization data" or "second synchronization data".

In a "synchronization correction value calculation mode", the switching unit 19b connects the output side of the synchronization data generation unit 19a to the input side of the synchronization correction value calculation unit 19c and the data input/output terminal 12 and inputs first synchronization data output from the synchronization data generation unit 19a to the synchronization correction value calculation unit 19c so that the first synchronization data is output to the outside through the data input/output terminal 12.

In an "RF signal measurement mode", the switching unit 19b connects the output side of the synchronization data generation unit 19a to the input side of the correction unit 19d and inputs RF data output from the synchronization data generation unit 19a to the correction unit 19d.

The operator can use the operation unit 17 to select the RF signal measurement mode or the synchronization correction value calculation mode.

On the basis of the first synchronization data generated by the synchronization data generation unit 19a and the first synchronization data or the second synchronization data generated by the synchronization data generation unit 19a of any one of the other signal analysis devices SA2, SA3, . . . , the synchronization correction value calculation unit 19c can calculate the amplitude ratio, phase difference, and timing difference (time difference) between the two synchronization data items as a first synchronization correction value or a second synchronization correction value.

The synchronization correction value calculation unit 19c is not necessarily provided in each of the signal analysis devices SA1, SA2, . . . , but may be provided in an external control device (not shown). In this case, for example, the synchronization data generation unit 19a and the correction unit 19d in each of the signal analysis devices SA1, SA2, . . . exchange the first synchronization data or the second synchronization data and the first synchronization correction value or the second synchronization correction value with the synchronization correction value calculation unit 19c in the external control device through the data input/output terminal 12.

Figure 3:
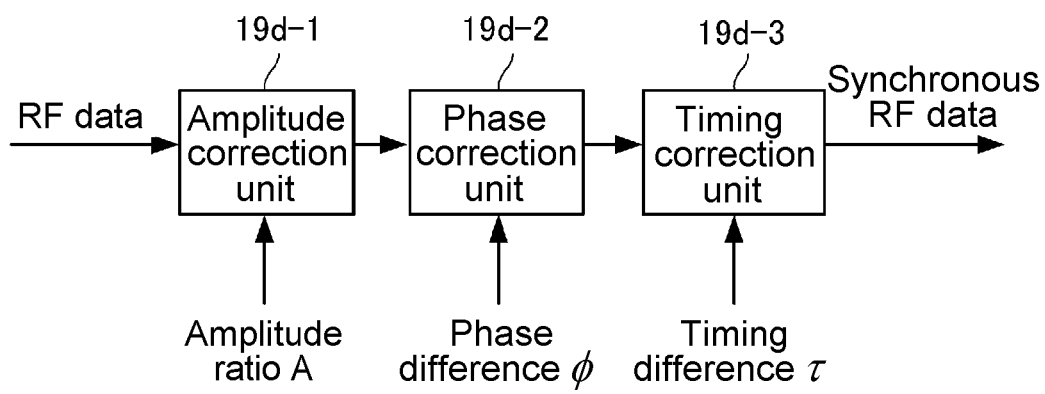
FIG. 3 is a block diagram illustrating the structure of a correction unit of the signal analysis device provided in the synchronization system according to the embodiment of the invention.

As shown in FIG. 3, the correction unit 19d includes an amplitude correction unit 19d-1 to which the amplitude ratio is set, a phase correction unit 19d-2 to which the phase difference is set, and a timing correction unit 19d-3 to which the timing difference is set.

The amplitude correction unit 19d-1 can correct the amplitude of the RF data, on the basis of the amplitude ratio calculated by the synchronization correction value calculation unit 19c or the amplitude ratio calculated by the synchronization correction value calculation unit 19c of any one of the other signal analysis devices SA2, SA3, . . . , in the RF signal measurement mode in which the RF signal from the object to be measured is input to the mixer unit 13c.

Similarly, the phase correction unit 19d-2 can correct the phase of the RF data on the basis of the phase difference calculated by the synchronization correction value calculation unit 19c of any one of the signal analysis devices SA1, SA2, . . . .

The timing correction unit 19d-3 can correct the timing of the RF data on the basis of the timing difference calculated by the synchronization correction value calculation unit 19c of any one of the signal analysis devices SA1, SA2, . . . .

The correction unit 19d stores the RF data which has been corrected on the basis of the first synchronization correction value or the second synchronization correction value in the memory area, using the corrected time as an address.

The control unit 18 is, for example, a microcomputer and controls the overall operation of the device. Alternatively, the control unit 18 may be integrated with the synchronization processing unit 19 and may be a FPGA or an ASIC.

The signal analysis unit 15 includes, for example, an FFT processing unit 15a, a detection unit 15b, a log conversion unit 15c, and a storage unit 15d and analyzes the RF signal in the RF signal measurement mode.

In the structure shown in FIG. 2, the signal analysis unit 15 performs FFT processing. This is an illustrative example and the processing method of the signal analysis unit 15 is not limited to the FFT processing. For example, the signal analysis unit 15 may perform modulation analysis or it may perform processing, such as Power vs Time, Frequency vs Time, or Phase vs Time. That is, these analysis processing methods can also be applied to the invention. Since these analysis processing methods can be understood by those skilled in the signal analysis device, the description thereof will not be repeated.

The FFT processing unit 15a receives an observation frequency fv and an observation time tv from the operation unit 17 and reads time domain data (RF data) for the corresponding measurement frequency and the elapsed time of the clock from the synchronization data generation unit 19a.

Then, the FFT processing unit 15a performs FFT processing on the received time domain data at a predetermined time interval to convert the time domain data into frequency domain data and calculates each frequency component and the size thereof in a desired resolution bandwidth (RBW) in the range of the observation bandwidth ΔF designated by the operation unit 17.

In this case, when the time interval of the FFT processing is Δt, the FFT processing unit 15a reads time domain data corresponding to a time window ΔT (ΔT≥Δt) at each processing time from the time domain data of the observation frequency from the correction unit 19d and performs the FFT processing.

The FFT processing unit 15a repeats the FFT processing until the observation time tv while shifting the processing time for each time window T by one interval Δt. That is, the FFT processing unit 15a reads time domain data corresponding to ±ΔT/2 centered on a time position (address) m×Δt at a time m×Δt (for example, m is 1 to tv/Δt) and performs FFT processing. The FFT processing unit 15a repeats this process until m=tv/Δt is established.

The time window ΔT is a sufficient amount of time to convert the time domain data into the frequency domain data. In an extreme case, when the time domain data less than one period is converted into the frequency domain data, it is difficult to specify the frequency with high resolution. The time interval Δt may have the same period as the clock of the A/D conversion unit 14.

The detection unit 15b converts the size (power) of each frequency component into an effective value, an average value, or a peak value and outputs the converted value (hereinafter, referred to as "power"). The log conversion unit 15c compresses the output from the detection unit 15b into a logarithm and transmits the logarithm to the storage unit 15d.

The storage unit 15d stores the power of the corresponding frequency component in the memory area in which, for example, one address is the observation frequency fv and the other address is the lapse of the observation time tv.

The display unit 16 displays the power of each observation frequency component stored in the storage unit 15d as a color parameter on the coordinate system in which, for example, the vertical axis is the observation frequency and the horizontal axis is the observation time.

Next, a method for synchronizing a plurality of signal analysis devices in the synchronization system 1 according to this embodiment will be described with reference to FIGS. 1 and 2. For simplicity, the description is focused on two signal analysis devices SA1 and SA2.

First, the operator operates the operation unit 17 of the signal analysis device SA1 to set the synchronization correction value calculation mode to the signal analysis device SA1. Then, the switching unit 19b of the signal analysis device SA1 connects the output side of the synchronization data generation unit 19a to the input side of the synchronization correction value calculation unit 19c and the data input/output terminal 12.

Then, the signal generator 100 inputs the same phase modulation signal to the mixer units 13c of the RF units 13 of the two signal analysis devices SA1 and SA2 through the signal input terminal 21 at the same time. It is assumed that the phase modulation signal is, for example, a sine-wave signal. In addition, the signal generator 100 inputs the same trigger signal to the synchronization data generation units 19a of the synchronization processing units 19 of the two signal analysis devices SA1 and SA2 through the trigger input terminal 11 at the same time (phase modulation signal input step).

Then, the mixer unit 13c mixes the phase modulation signal output from the signal generator 100 and the local signal output from the local signal generation unit 13b to convert the phase modulation signal into an intermediate frequency signal in a predetermined intermediate frequency band and outputs the intermediate frequency signal.

Then, the A/D conversion unit 14 samples the intermediate frequency signal output from the mixer unit 13c with a predetermined clock from the control unit 18 and converts the intermediate frequency signal into digital data.

Then, the synchronization data generation units 19a of the signal analysis devices SA1 and SA2 output the digital data output from the A/D conversion unit 14 as first synchronization data or second synchronization data which is associated with the time based on the timing of the trigger signal input from the signal generator 100 (synchronization data generation step).

Next, the process of the synchronization correction value calculation step performed by the synchronization correction value calculation unit 19c will be described. Here, an example will be described in which the synchronization correction value calculation unit 19c of the signal analysis device SA1 calculates the first synchronization correction value or the second synchronization correction value on the basis of the first synchronization data or the second synchronization data generated by the synchronization data generation unit 19a of the signal analysis device SA1 and the first synchronization data or the second synchronization data generated by the synchronization data generation unit 19a of the signal analysis device SA2.

When the amplitude of a data string $s_1(t)$ of the first synchronization data in the signal analysis device SA1 is $A_1$, the amplitude of a data string $s_2(t)$ of the second synchronization data in the signal analysis device SA2 is $A_2$, the initial phase of the data string $s_1(t)$ caused by the local signal generation unit 13b is $\phi_1$ [rad], the initial phase of the data string $s_2(t)$ caused by the local signal generation unit 13b is $\phi_2$ [rad], and the maximum phase shift amount is k [rad], the data strings $s_1(t)$ and $s_2(t)$ are represented by Equation 2 and Equation 3, respectively.

$$s_1(t) = A_1 e^{-i(k\cos b(t))} \times e^{i\phi_1} \qquad \text{[Equation 2]}$$

$$s_2(t) = A_2 e^{-i(k\cos b(t))} \times e^{i\phi_2} \qquad \text{[Equation 3]}$$

When the timing difference between $s_1(t)$ and $s_2(t)$ is $\tau$[s], the ratio R ($=s_1/s_2$) of the data string $s_1(t)$ to the data string $s_2(t)$ is represented by Equation 4.

$$R(t, \tau) = \frac{s_1\left(t - \frac{\tau}{2}\right)}{s_2\left(t + \frac{\tau}{2}\right)} = \frac{A_1 e^{i\left(k\cos b\left(t - \frac{\tau}{2}\right)\right)} \times e^{i\varphi_1}}{A_2 e^{i\left(k\cos b\left(t + \frac{\tau}{2}\right)\right)} \times e^{i\varphi_2}} \qquad \text{[Equation 4]}$$

$$= \frac{A_1}{A_2} e^{i(\varphi_1 - \varphi_2)} e^{i\left(k\cos b\left(t - \frac{\tau}{2}\right) - k\cos b\left(t + \frac{\tau}{2}\right)\right)}$$

When Equation 4 is modified by the sum and product formula, Equation 5 is obtained.

$$R(t, \tau) = \frac{A_1}{A_2} e^{i(\varphi_1 - \varphi_2)} e^{i\left(2k\sin\frac{b\tau}{2}\sin bt\right)} \qquad \text{[Equation 5]}$$

The amplitude ratio A of $s_1(t)$ to $s_2(t)$ can be calculated from $A_1/A_2$ in Equation 5. The phase difference $\phi$ [rad] between $s_1(t)$ and $s_2(t)$ can be calculated from $\exp\{i(\phi_1-\phi_2)\}$ in Equation 5. The timing difference $\tau$ [s] can be calculated from $\exp\{i2k \sin(b\tau/2)\sin(bt)\}$ in Equation 5.

Figure 4:
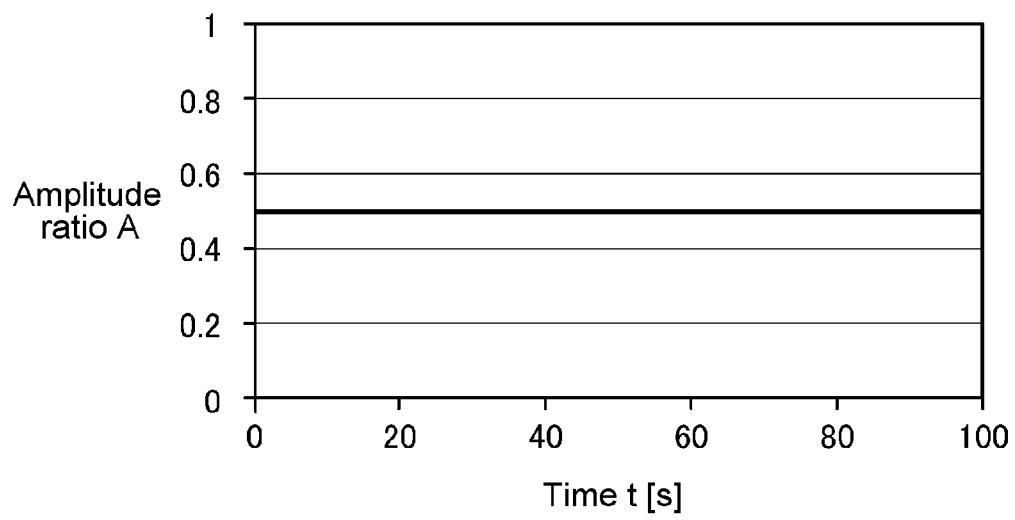
FIG. 4 is a graph illustrating a synchronization method using the synchronization system according to the embodiment of the invention.
Figure 4:
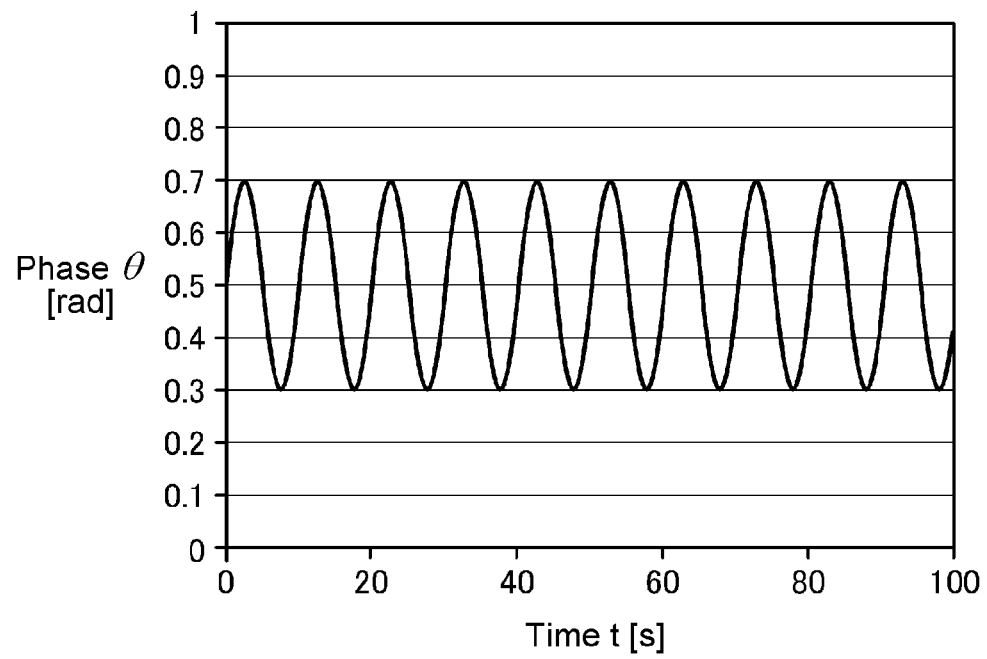
Figure 5:
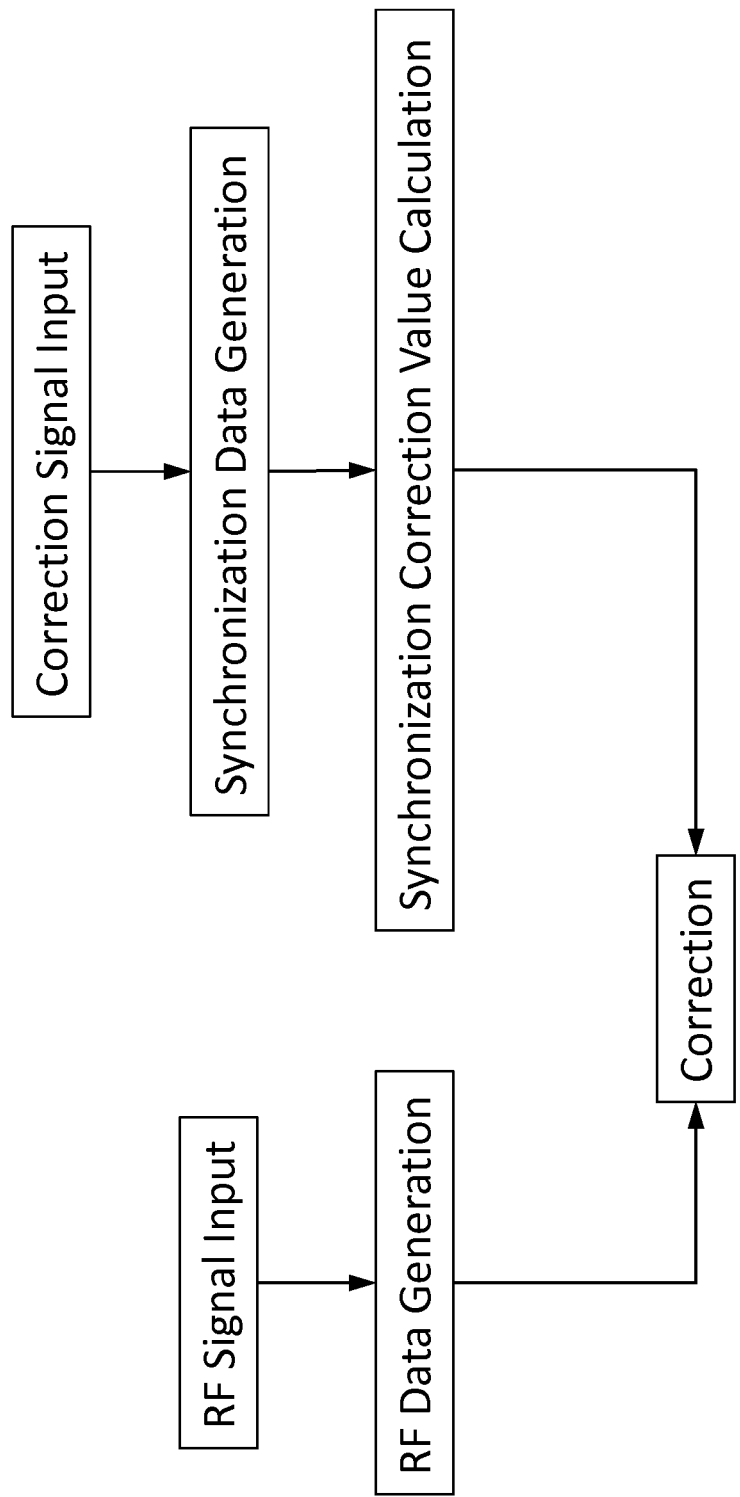
FIG. 5 is a flow chart illustrating an example synchronization method that synchronizes a plurality of the signal analysis devices.

Equation 5 is represented by a graph, as shown in FIG. 4. FIG. 4(a) shows the amplitude ratio A of Equation 5. FIG. 4(b) shows the phase component of Equation 5.

Equation 5 is a continuous function. In practice, it is assumed that the synchronization correction value calculation unit 19c is capable of handling a discrete value after A/D conversion. That is, in practice, the ratio R ($=s_1/s_2$) of the data string $s_1(n)$ to the data string $s_2(n)$ calculated by the synchronization correction value calculation unit 19c is discrete value data and is represented by $R_q(n)$.

As shown in Equation 6, the synchronization correction value calculation unit 19c calculates the average amplitude of $R_q(n)$ to calculate the amplitude ratio A.

$$A = \frac{1}{N}\sum_{n=0}^{N-1} \|R_q(n)\| \qquad \text{[Equation 6]}$$

Here, it is preferable that N indicating the average range of the data string have a value corresponding to time that is an integer multiple of the modulation period of the phase modulation signal. The reason is that, since a phase component is represented as a sine wave with the modulation period of the phase modulation signal, N needs to be an integer multiple of the modulation period in order to calculate the average value in Equation 6 without an error.

Then, the synchronization correction value calculation unit 19c calculates a phase component $\theta_q(n)$ of $R_q(n)$ from Equation 7 in order to calculate the phase difference $\phi$ and the timing difference T.

$$\theta_q(n) = \arg(R_q(n)) \qquad \text{[Equation 7]}$$

The synchronization correction value calculation unit 19c fits a set of the discrete values represented by Equation 7 and the sin function represented by Equation 8 using a least square method to optimize parameters (p, q, and r). In Equation 8, p corresponds to the phase modulation amplitude represented by Equation 9. In addition, b is a known value including information about the phase modulation speed. Furthermore, q includes information about the timing difference $\tau$. In addition, r corresponds to the phase difference $\phi$ ($=\phi_1-\phi_2$) between the initial phases.

$$y_i = \theta_q(x_i) = p\sin(bx_i + q) + r \qquad \text{[Equation 8]}$$

$$p = 2k\sin\frac{b\tau}{2} \qquad \text{[Equation 9]}$$

When the observation error of data ($x_i$, $y_i$) is represented by $\epsilon_i$, Equation 8 can be represented as Equation 10.

$$\epsilon_i = p \sin(bx_i+q)+r-y_i \qquad \text{[Equation 10]}$$

The square average error E of the observation error $\epsilon_i$ can be represented by Equation 11.

$$E = \frac{1}{N}\sum_{i=0}^{N-1} \epsilon_i^2 \qquad \text{[Equation 11]}$$

The observation error $\epsilon_i$ is modified to Equation 12 by the addition theorem of the trigonometric function.

$$\epsilon_i = p\sin(bx_i + q) + r - y_i = \qquad \text{[Equation 12]}$$
$$p\{\sin(bx_i)\cos(q) + \cos(bx_i)\sin(q)\} + r - y_i$$
$$= \{p\cos(q)\sin(bx_i) + p\sin(q)\cos(bx_i)\} + r - y_i$$
$$= \{p'\sin(bx_i) + q'\cos(bx_i)\} + r - y_i$$

In Equation 12, p' and q' are represented by Equation 13.

$$p'=p\cos(q), q'=p\sin(q) \qquad \text{[Equation 13]}$$

Here, a necessary condition for determining a combination of the values (p', q', and r) for obtaining the minimum square average error E is that the square average error E has an extreme value at the values (p', q', and r), as represented by Equation 14.

$$\frac{\partial E}{\partial p'} = 0, \frac{\partial E}{\partial q'} = 0, \frac{\partial E}{\partial r} = 0 \qquad \text{[Equation 14]}$$

When each expression in Equation 14 is calculated, Equations 15 to 17 are obtained.

[Equation 15]

$$\frac{\partial E}{\partial p'} = \frac{\partial}{\partial p'} \frac{1}{N} \sum_{i=0}^{N-1} \epsilon_i^2$$

$$N\frac{\partial E}{\partial p'} = \sum_{i=0}^{N-1} \frac{\partial}{\partial p'} \epsilon_i^2 = \sum_{i=0}^{N-1} 2\epsilon_i \frac{\partial}{\partial p'} \epsilon_i = \sum_{i=0}^{N-1} 2\{p'\sin(bx_i) + q'\cos(bx_i) + r - y_i\}\sin(bx_i)$$

$$= 2\left\{p'\sum_{i=0}^{N-1} \sin^2(bx_i) + q'\sum_{i=0}^{N-1} \sin(bx_i)\cos(bx_i) + r\sum_{i=0}^{N-1} \sin(bx_i) - \sum_{i=0}^{N-1} y_i \sin(bx_i)\right\}$$

$$= 0$$

[Equation 16]

$$N\frac{\partial E}{\partial q'} = \sum_{i=0}^{N-1} 2\{p'\sin(bx_i) + q'\cos(bx_i) + r - y_i\}\cos(bx_i)$$

$$= 2\left\{p'\sum_{i=0}^{N-1} \sin(bx_i)\cos(bx_i) + q'\sum_{i=0}^{N-1} \cos^2(bx_i) + r\sum_{i=0}^{N-1} \cos(bx_i) - \sum_{i=0}^{N-1} y_i \cos(bx_i)\right\}$$

$$= 0$$

[Equation 17]

$$N\frac{\partial E}{\partial r} = \sum_{i=0}^{N-1} 2\{p'\sin(bx_i) + q'\cos(bx_i) + r - y_i\}$$

$$= 2\left\{p'\sum_{i=0}^{N-1} \sin(bx_i) + q'\sum_{i=0}^{N-1} \cos(bx_i) + rN - \sum_{i=0}^{N-1} y_i\right\}$$

$$= 0$$

In the above-mentioned three equations, that is, Equations 15 to 17, when attention is paid only to the parameters (p', q', and r), the equations can be treated as simultaneous linear equations with three variables. Therefore, Equations 15 to 17 can be represented by a matrix as shown in Equation 18.

[Equation 18]

$$\begin{bmatrix} \sum_{i=0}^{N-1} \sin^2(bx_i) & \sum_{i=0}^{N-1} \sin(bx_i)\cos(bx_i) & \sum_{i=0}^{N-1} \sin(bx_i) \\ \sum_{i=0}^{N-1} \sin(bx_i)\cos(bx_i) & \sum_{i=0}^{N-1} \cos^2(bx_i) & \sum_{i=0}^{N-1} \cos(bx_i) \\ \sum_{i=0}^{N-1} \sin(bx_i) & \sum_{i=0}^{N-1} \cos(bx_i) & N \end{bmatrix} \begin{bmatrix} p' \\ q' \\ r \end{bmatrix} =$$

$$\begin{bmatrix} \sum_{i=0}^{N-1} y_i \sin(bx_i) \\ \sum_{i=0}^{N-1} y_i \cos(bx_i) \\ \sum_{i=0}^{N-1} y_i \end{bmatrix}$$

For simplicity, Equation 18 is rewritten as Equation 19.

$$C\begin{bmatrix} p' \\ q' \\ r \end{bmatrix} = D \quad \text{[Equation 19]}$$

An inverse matrix $C^{-1}$ can be applied to both sides of Equation 19 to calculate the optimized values (p', q', and r), as shown in Equation 20.

$$\begin{bmatrix} p' \\ q' \\ r \end{bmatrix} = C^{-1} D \quad \text{[Equation 20]}$$

Equation 21 is obtained by the relationship of Equation 13 and it is possible to calculate the values of the parameters p and q. Here, a tan 2(a, b) is a function for calculating an argument when the y direction is a and the x direction is b.

$$p=\sqrt{p'^2+q'^2}, q=a\tan 2(q,p) \quad \text{[Equation 21]}$$

As described above, the estimated value of the phase difference φ [rad] is given as shown in Equation 22. In addition, the estimated value of the timing difference τ [s] is given from the relation of the above-mentioned Equation 9, as shown in Equation 23.

$$\varphi = r \quad \text{[Equation 22]}$$

$$\tau = \frac{2}{b}\sin^{-1}\frac{p}{2k} \quad \text{[Equation 23]}$$

Here, in order to uniquely calculate the timing difference τ, (bτ/2) needs to be a value in a range less than the width π, such as (−π/2, π/2). Therefore, when the maximum value of the absolute value of the timing difference τ is $\tau_m$ [s], for example, the value of b needs to be limited such that Equation 24 is established.

$$b < \frac{\pi}{\tau_m} \quad \text{[Equation 24]}$$

That is, the phase modulation speed of the phase modulation signal output from the signal generator 100 is defined by Equation 24.

As described above, the synchronization correction value calculation unit 19c can calculate, as the first synchronization correction value or the second synchronization correction value, the amplitude ratio A, the phase difference φ, and the timing difference τ from Equation 6, Equation 22, and Equation 23, respectively.

Then, the operator operates, for example, the operation unit 17 of the signal analysis device SA2 to set the signal analysis device SA2 to the RF signal measurement mode. Then, the switching unit 19b of the signal analysis device SA2 connects the output side of the synchronization data generation unit 19a to the input side of the correction unit 19d.

Then, the RF signal output from the object to be measured is input to the mixer unit 13c of the RF unit 13 in the signal analysis device SA2. The signal generator 100 inputs the same trigger signal to the synchronization data generation units 19a of the synchronization processing units 19 in the two signal analysis devices SA1 and SA2 through the trigger input terminal 11 at the same time (RF signal input step).

Then, the mixer unit 13c of the signal analysis device SA2 to which the RF signal is input mixes the RF signal and the local signal output from the local signal generation unit 13b to convert the RF signal into an intermediate frequency signal in a predetermined intermediate frequency band and outputs the intermediate frequency signal.

Then, the A/D conversion unit 14 of the signal analysis device SA2 samples the intermediate frequency signal output from the mixer unit 13c with a predetermined clock from the control unit 18 to convert the signal into digital data.

Then, the synchronization data generation unit 19a of the signal analysis device SA2 outputs the digital data output from the A/D conversion unit 14 as RF data which is associated with time based on the timing of the trigger signal input from the signal generator 100 (RF data generation step).

Then, the correction unit 19d of the signal analysis device SA2 corrects the amplitude, phase, and timing of the RF data which results from the RF signal input to the signal analysis device SA2, using the first synchronization correction value or the second synchronization correction value calculated by the synchronization correction value calculation unit 19c of the signal analysis device SA1 (correction step).

In this way, the synchronization system 1 according to this embodiment can correct a propagation delay caused by the internal path of the signal analysis device SA2 on the basis of the signal analysis device SA1. Similarly, the synchronization method according to this embodiment can be sequentially performed on the other signal analysis devices SA3, SA4, ... on the basis of the signal analysis device SA1 to synchronize all of the signal analysis devices SA1, SA2, ....

The calculation and setting of the first synchronization correction value or the second synchronization correction value in the synchronization correction value calculation mode may be performed before the shipment of the signal analysis device or synchronization system or before the RF signal measurement mode is performed, or they may be performed by the operator at any time.

As described above, according to this embodiment, two signal analysis devices are sequentially selected, the ratio of the first synchronization data items or the second synchronization data items generated by the two signal analysis devices is calculated, an averaging process is performed on the ratio, and fitting is performed by the least square method. Therefore, it is possible to correct the timing between the signal analysis devices with accuracy more than or equal to that of an ADC clock.

As described above, when the signal to be measured is measured using a plurality of signal analysis devices, it is possible to completely synchronize the signal analysis devices. Therefore, it is possible to perform measurement with high accuracy.

INDUSTRIAL APPLICABILITY

The signal analysis device, the synchronization system, and the synchronization method according to the invention can be applied to, for example, a communication system that transmits and receives a plurality of different signals at the same time using a technique such as MIMO.

DESCRIPTION OF REFERENCE NUMERALS AND SIGNS

1: SYNCHRONIZATION SYSTEM
SA1, SA2, ... : SIGNAL ANALYSIS DEVICE
11: TRIGGER INPUT TERMINAL
12: DATA INPUT/OUTPUT TERMINAL
13: RF UNIT
13a: SWEEP UNIT
13b: LOCAL SIGNAL GENERATION UNIT
13c: MIXER UNIT
14: A/D CONVERSION UNIT
15: SIGNAL ANALYSIS UNIT
15a: FFT PROCESSING UNIT
15b: DETECTION UNIT
15c: LOG CONVERSION UNIT
15d: STORAGE UNIT
16: DISPLAY UNIT
17: OPERATION UNIT
18: CONTROL UNIT
19: SYNCHRONIZATION PROCESSING UNIT
19a: SYNCHRONIZATION DATA GENERATION UNIT
19b: SWITCHING UNIT
19c: SYNCHRONIZATION CORRECTION VALUE CALCULATION UNIT
19d: CORRECTION UNIT
19d-1: AMPLITUDE CORRECTION UNIT
19d-2: PHASE CORRECTION UNIT
19d-3: TIMING CORRECTION UNIT
20: HOUSING
21: SIGNAL INPUT TERMINAL
22: REFERENCE FREQUENCY INPUT TERMINAL
100: SIGNAL GENERATOR

What is claimed is:

1. A synchronization system that synchronizes a plurality of signal analysis devices, comprising:
the plurality of signal analysis devices that analyze a radio frequency (RF) signal output from an object to be measured, each of the plurality of signal analysis devices comprising:
a local signal generation unit that generates a local signal;
a mixer unit that receives the local signal and the RF signal at a first time or receives the local signal and a correction signal, which is externally inputted, at a second time, converts the RF signal or the correction signal into an intermediate frequency signal in a predetermined intermediate frequency band, and outputs the intermediate frequency signal;
an analog-to-digital converter that samples the intermediate frequency signal to convert the intermediate frequency signal into a digital signal string;
a synchronization data generation unit that outputs the intermediate frequency signal as first synchronization data which is associated with time based on timing of a trigger signal externally inputted, when the correction signal is input to the mixer unit;
a synchronization correction value calculation unit that calculates an amplitude ratio, a phase difference, and a time difference between the first synchronization data which is output from the synchronization data generation unit and second synchronization data which is externally inputted as a first synchronization correction value, on the basis of the first synchronization data and the second synchronization data; and a correction unit that corrects the amplitude, phase, and timing of the RF signal on the basis of the first synchronization correction value calculated by the synchronization correction value calculation unit when the RF signal is input to the mixer unit; and a signal generator that simultaneously inputs the same correction signal to the mixer units of two of the plurality of signal analysis devices and simultaneously inputs the same trigger signal to the synchronization data generation units of the two signal analysis devices.

2. The synchronization system according to claim 1, wherein the first synchronization data which is output from the synchronization data generation unit of one of the two signal analysis devices is input to the synchronization correction value calculation unit of the other of the two signal analysis devices.

3. The synchronization system according to claim 1, wherein the first synchronization correction value which is output from the synchronization correction value calculation unit of one of the two signal analysis devices is input to the correction unit of the other of the two signal analysis devices.

4. The synchronization system according to claim 2, wherein the first synchronization correction value which is output from the synchronization correction value calculation unit of one of the two signal analysis devices is input to the correction unit of the other of the two signal analysis devices.

5. A synchronization system that synchronizes a plurality of signal analysis devices, comprising:

the plurality of signal analysis devices that analyze a radio frequency (RF) signal output from an object to be measured, each of the plurality of signal analysis devices comprising:

a local signal generation unit that generates a local signal;

a mixer unit that receives the local signal and the RF signal at a first time or receives the local signal and a correction signal, which is externally inputted, at a second time, converts the RF signal or the correction signal into an intermediate frequency signal in a predetermined intermediate frequency band, and outputs the intermediate frequency signal;

an analog-to-digital converter that samples the intermediate frequency signal to convert the intermediate frequency signal into a digital signal string;

a synchronization data generation unit that outputs the intermediate frequency signal as first synchronization data which is associated with time based on timing of a trigger signal externally inputted, when the correction signal is input to the mixer unit;

a synchronization correction value calculation unit that calculates an amplitude ratio, a phase difference, and a time difference between the first synchronization data which is output from the synchronization data generation unit and second synchronization data which is externally inputted as a first synchronization correction value, on the basis of the first synchronization data and the second synchronization data; and a correction unit that corrects the amplitude, phase, and timing of the RF signal on the basis of the first synchronization correction value calculated by the synchronization correction value calculation unit when the RF signal is input to the mixer unit; and a signal generator that simultaneously inputs the same correction signal to the mixer units of two of the plurality of signal analysis devices and simultaneously inputs the same trigger signal to the synchronization data generation units of the two signal analysis devices, wherein, when the RF signal is input to the mixer unit, the correction unit corrects the amplitude, phase, and timing of the RF signal on the basis of the first synchronization correction value which is calculated by the synchronization correction value calculation unit or a second synchronization correction value which is externally inputted.

6. The synchronization system according to claim 5, wherein the first synchronization data which is output from the synchronization data generation unit of one of the two signal analysis devices is input to the synchronization correction value calculation unit of the other of the two signal analysis devices.

7. The synchronization system according to claim 5, wherein the first synchronization correction value which is output from the synchronization correction value calculation unit of one of the two signal analysis devices is input to the correction unit of the other of the two signal analysis devices.

8. The synchronization system according to claim 6, wherein the first synchronization correction value which is output from the synchronization correction value calculation unit of one of the two signal analysis devices is input to the correction unit of the other of the two signal analysis devices.

9. A synchronization method that synchronizes a plurality of the signal analysis devices, each of the plurality of signal analysis devices configured according to claim 1, the synchronization method comprising:

a correction signal input step of simultaneously inputting the same correction signal to the mixer units of two of the plurality of signal analysis devices and simultaneously inputting the same trigger signal to the synchronization data generation units of the two signal analysis devices;

a synchronization data generation step of allowing the synchronization data generation unit of one of the two signal analysis devices to generate the first synchronization data in which the time based on the timing of the trigger signal is associated with the intermediate frequency signal of the correction signal output from the mixer unit of the one of the two signal analysis devices;

a synchronization correction value calculation step of calculating, as the first synchronization correction value, the amplitude ratio, the phase difference, and the time difference between the first synchronization data which is generated in the synchronization data generation step and the second synchronization data generated by the synchronization data generation unit of the other of the two signal analysis devices, on the basis of the first synchronization data and the second synchronization data;

an RF signal input step of inputting the RF signal which is output from the object to be measured to the mixer unit of the one of the two signal analysis devices and simultaneously inputting the same trigger signal to the synchronization data generation units of the two signal analysis devices;

an RF data generation step of allowing the synchronization data generation unit of the signal analysis device, to which the RF signal is input, to generate RF data in which the time based on the timing of the trigger signal is associated with an intermediate frequency signal of the RF signal output from the mixer unit of the one of the two signal analysis devices; and a correction step of correcting the amplitude, phase, and timing of the RF signal on the basis of the first synchronization correction value calculated in the synchronization correction value calculation step.

* * * * *